United States Patent [19]

Nebelung et al.

[11] Patent Number: 4,490,164
[45] Date of Patent: Dec. 25, 1984

[54] MOULD ARRANGEMENT FOR USE IN A GLASSWARE CONTAINER MANUFACTURING MACHINE

[75] Inventors: Hermann H. Nebelung, Zurich, Switzerland; Werner-Dieter Knoth, Essen, Fed. Rep. of Germany

[73] Assignee: Emhart Industries, Inc., Farmington, Conn.

[21] Appl. No.: 553,939

[22] Filed: Nov. 21, 1983

[30] Foreign Application Priority Data

Dec. 2, 1982 [GB] United Kingdom ............... 8234406

[51] Int. Cl.³ ............................................. C03B 9/20
[52] U.S. Cl. .................................. 65/263; 65/267; 65/305; 65/319
[58] Field of Search ............... 65/263, 267, 305, 319

[56] References Cited

U.S. PATENT DOCUMENTS

| 3,653,870 | 4/1972 | Foster et al. | 65/319 |
| 4,276,073 | 6/1981 | Northup | 65/263 X |
| 4,388,099 | 6/1983 | Hermening et al. | 65/267 |
| 4,392,880 | 7/1983 | Dahms | 65/267 X |

Primary Examiner—Robert L. Lindsay, Jr.
Attorney, Agent, or Firm—H. Samuel Kieser

[57] ABSTRACT

Two mould portion carriers (14,16) are supported for pivoting movement about a column (12). Two cooling passages (44,48) pass through the column and each is connected to a passage (56,96) in one of the carriers. Each passage (56,96) in a carrier is connected to passages (82,84,86,88) in a mould portion (18) supported by the carrier (14,16) so that air under pressure supplied to the passages (44,48) in the column (12) is supplied to the passages in the mould portion to cool the mould portion. The air supply to each of the passages in the column is controllable independently so that the air supply to each mould portion is independent.

5 Claims, 2 Drawing Figures

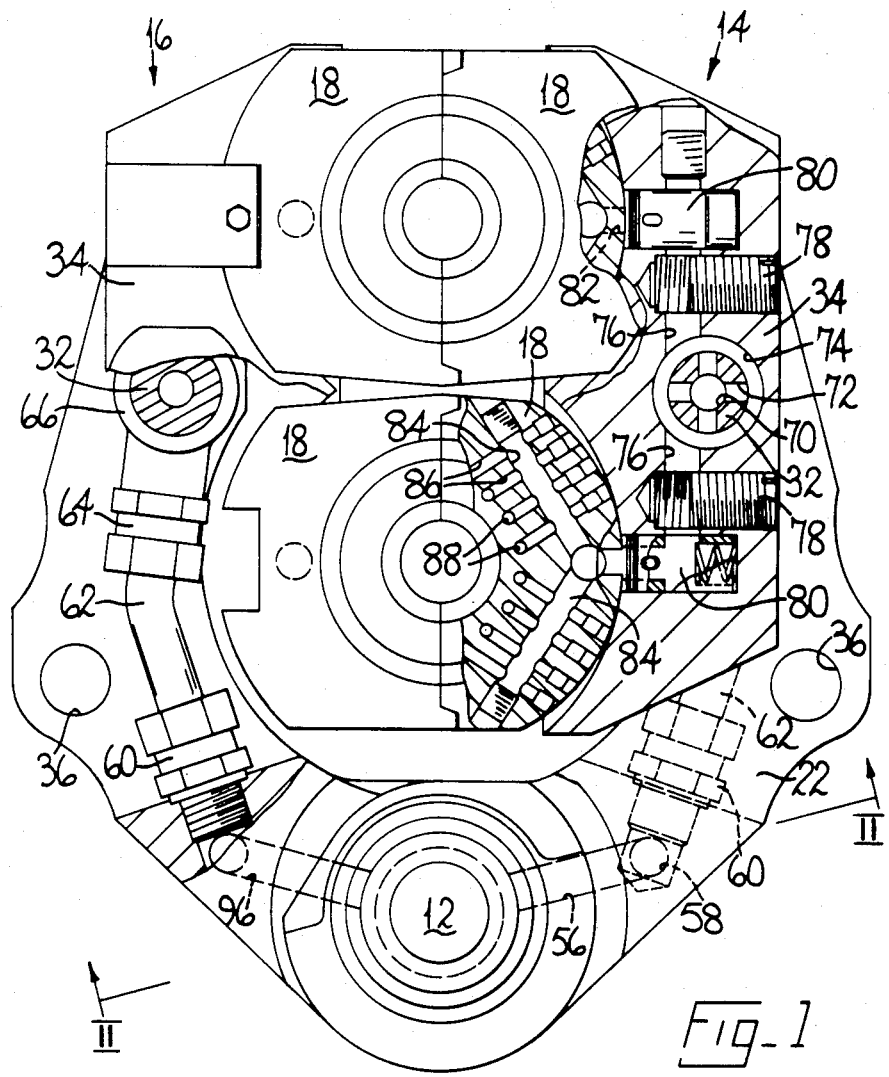
Fig_1

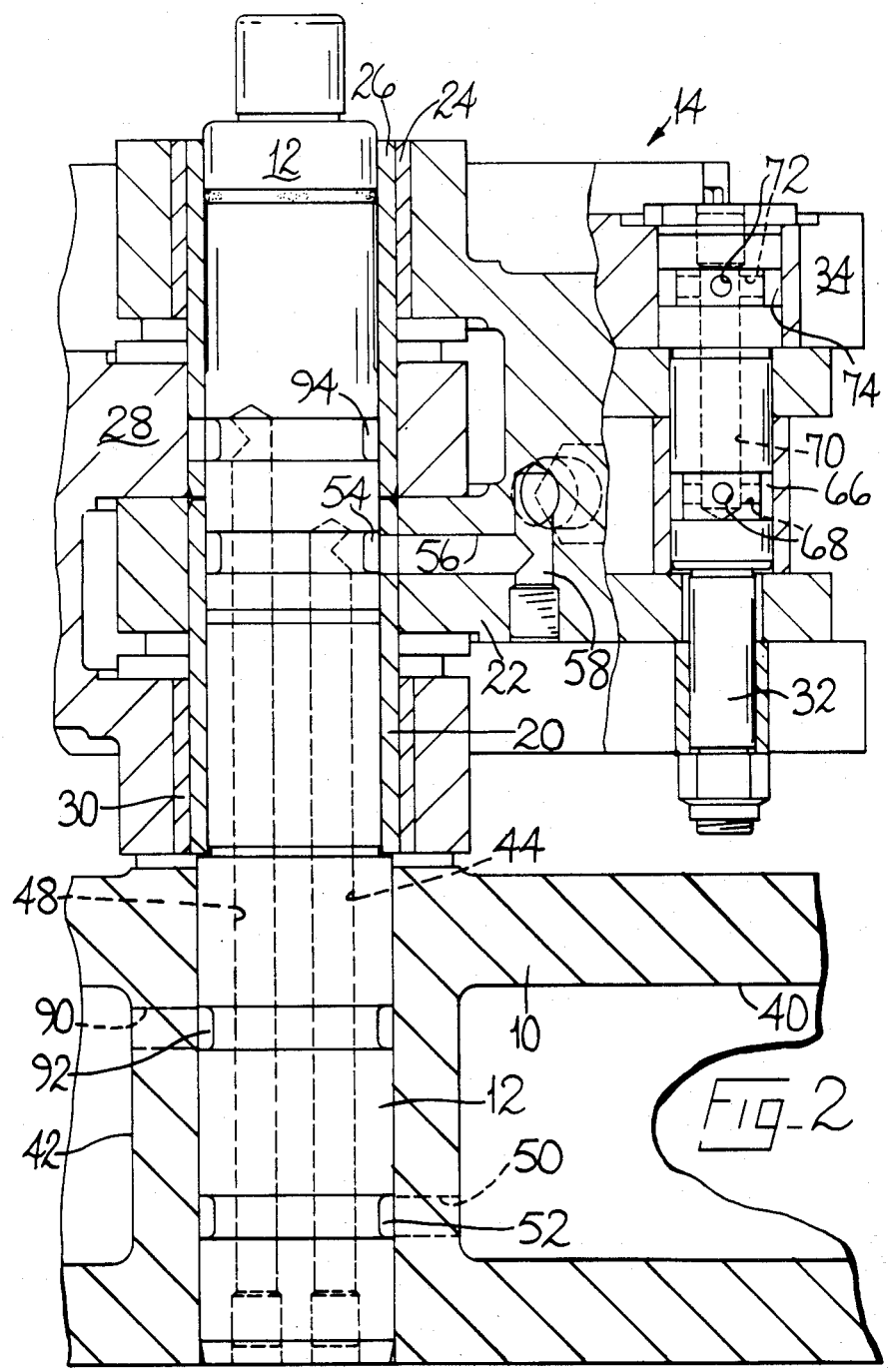
Fig_2

MOULD ARRANGEMENT FOR USE IN A GLASSWARE CONTAINER MANUFACTURING MACHINE

BACKGROUND OF THE INVENTION

This invention is concerned with a mould arrangement for use in a glassware container manufacturing machine comprising two mould portion carriers arranged to carry opposed mould portions, a column on which the carriers are both supported for pivoting movement about the column either towards one another to bring opposed mould portions into engagement with one another or away from one another to move opposed mould portions into mould open positions thereof, and cooling means operative to cool mould portions supported by the carriers.

Mould arrangements as described above are known in which the cooling means comprises passages in a mould carrier which pass cooling air to passages in a mould portion supported by the carrier so that the air passes through the passages in the mould portion and serves to cool it. In such cooling means, the air reaches the passages in the carrier either through flexible or articulated pipes attached to the carrier or through openings in a frame of the machine which communicate with openings to the passages in the carrier at certain positions of the carrier. Where flexible or articulated pipes are used, they constitute a source of potential failure of the arrangement as they are exposed to damage and are generally inconvenient as they occupy considerable space. Where communicating openings in the frame and the carrier are used, it is not possible to provide cooling for the mould portion throughout the cycle of the machine, since cooling can only be applied when the openings are in communication.

It is an object of the present invention to provide a mould arrangement in which the cooling means comprises passages which pass cooling air to the mould portion carriers through passages which are not exposed and which communicate with the passages in the carriers throughout the cycle of the machine.

BRIEF SUMMARY OF THE INVENTION

The invention provides a mould arrangement for use in a glassware container manufacturing machine comprising two mould portion carriers arranged to carry opposed mould portions, a column on which the carriers are both supported for pivoting movement about the column either towards one another to bring opposed mould portions into engagement with one another or away from one another to move opposed mould portions into mould open positions thereof, and cooling means operative to cool mould portions supported by the carriers, characterised in that the cooling means comprises two passages passing longitudinally through the column, one of the passages being associated with each of the carriers, each passage being connected at one end portion thereof to a source of air under pressure and at an opposite end portion thereof to a passage in the carrier, the passage in the carrier being connected to passages in a mould portion supported by the carrier so that air entering the passage in the column passes into the passages in the mould portion, and the sources of air under pressure associated with each of the passages in the column being controllable independently of one another to vary the flow of air to the passages in the mould portion.

A mould arrangement according to the last preceding paragraph has the advantages that the passages through which the air passes into the passages in the carrier are not exposed, being in the column, and the sources of air under pressure can communicate with the passages in the mould portions throughout the cycle of the machine. Furthermore, the air supply to the mould portions carried by each carrier can be varied independently.

Where two or more mould portions are supported on the same carrier, it is usual to mount the mould portions on a support which is supported on the carrier for pivoting movement about a further column which is mounted on the carrier. This provides for movement of the mould portions relative to the carrier so as to equalise the mould closing forces between different moulds supported by the carriers. In this case, preferably the passage in the carrier is connected to a passage which passes longitudinally through the further column and is connected to two branch passages each of which is connected to the passages in one of the mould portions supported by the support. In order to enable the cooling to each mould portion supported by the supports to be varied independently, each branch passage may contain a throttle by which the flow of air to the passages in the mould portion can be varied.

Conveniently, the passages in each mould portion comprise a horizontal passage having an opening through an outside wall of the mould portion and connected to the passage in the carrier through a spring-loaded sealing member which is mounted on the carrier and makes sealing contact with the wall of the mould portion around the opening of the horizontal passage. Preferably, the horizontal passage in the mould portion is connected by further horizontal passages in the mould portion to vertical passages therein which have an opening through an end of the mould portion. In this way it is possible to distribute the cooling effect around the mould portion in any desired manner.

BRIEF DESCRIPTION OF THE DRAWINGS

There now follows a detailed description to be read with reference to the accompanying drawings of a mould arrangement which is illustrative of the invention. It is to be understood that the illustrative mould arrangement has been selected for description by way of example and not of limitation of the invention.

In the drawings:

FIG. 1 is a plan view of the illustrative mould arrangement, with parts broken away to show the construction; and FIG. 2 is a cross-sectional view taken on the line II—II in FIG. 1.

DETAILED DESCRIPTION OF PREFERRED EMBODIMENT OF THE INVENTION

The illustrative mould arrangement is for use in a glassware container manufacturing machine of the so-called "individual section" type. The illustrative mould arrangement is mounted on a frame 10 of the machine (see FIG. 2). The illustrative mould arrangement comprises a vertically-extending column 12 which is fixedly mounted on the frame 10. The arrangement also comprises two mould portion carriers 14 and 16 which are supported on the column for pivoting movement about the column 12 either towards one another to bring opposed mould portions 18 carried by the carriers 14 and 16 into engagement with one another or away from one another to move the mould portions 18 into mould open positions thereof.

The mould portion carrier 14 comprises a cylindrical sleeve 20 (see FIG. 2) which is received on the column 12 for pivoting movement thereon. The carrier 14 also comprises an arm 22 which is attached to the sleeve 20 and projects horizontally away from the column 12. The carrier 14 also comprises a bearing ring 24 attached to the arm 22 which is received on a sleeve 26 of the carrier 16 and is pivotally movable thereon. The sleeve 26 is received on the column 12 and forms part of the carrier 16. The carrier 16 also comprises an arm 28 integral with the sleeve 26 and projecting horizontally away from the column 12 and a bearing ring 30 which is received on the sleeve 20 and is pivotally movable thereon. Thus, the carriers 14 and 16 are each supported at two points on the column 12, once on the sleeve 24 or 26 and once on the bearing ring 24 or 30.

Each of the carriers 14 and 16 also comprises a further column 32 supported on the arm 22 or 28 thereof. The column 32 extends vertically and supports a support 34 which is mounted for pivoting movement on the column 32. Each of the supports 34 supports two mould portions 18 of different moulds so that the two supports 34 support opposed mould portions 18 of two different moulds. Each of the arms 22 and 28 is provided with a pivot pin receiving hole 36 by which the arms 22 and 28 are connected to moving means of the machine (not shown) by which the carriers 14 and 16 can be caused to pivot about the column 12 to move the carriers 14 and 16 either towards one another (into the position shown in FIG. 1) to bring the opposed mould portions 18 into engagement with one another or away from one another to move the opposed mould portions 18 into mould open positions thereof (not shown).

The illustrative mould arrangement also comprises cooling means operative to cool the mould portions 18 supported by the carriers 14 and 16. The cooling means comprises two sources of air under pressure, one source being associated with each of the carriers 14 and 16. One of the sources of air under pressure (not shown) is arranged to supply air to a chamber 40 formed in the frame 10 while the other source (also not shown) is arranged to supply air to a chamber 42 formed in the frame 10. The cooling means also comprises two passages 44 and 48 passing longitudinally through the column 12. One of the passages 44 and 48 is associated with each of the carriers 14 and 16 and each passage 44 and 48 is connected at a lower end portion thereof to the source of air under pressure associated with its carrier 14 or 16 and at an opposite end portion thereof to a passage in the carrier 14 or 16. The passage 44 is connected to the chamber 40 via a passage 50 which enters an annular space 52 formed between the column 12 and the frame 10, this space being connected to the passage 44 by a horizontal passage (not shown). The passage 44 is also connected to a annular space 54 by a horizontal passage (not shown) which communicates with a passage 56 in the carrier 14. The passage 56 passes through the sleeve 20 and the arm 22 to a vertical passage 58 formed in the arm 22. This passage 58 communicates with a connector 60 mounted on the arm 22. The connector is connected by means of a pipe 62 to a further connector 64 which is mounted on the arm 22 adjacent the column 32. Air entering the connector 64 passes into an annular space 66 formed between the column 32 and the arm 22 and from there passes through horizontal passages 68 (see FIG. 2) into a passage 70 which extends longitudinally upwards in the column 32. At an upper end portion thereof, the passage 70 communicates with horizontal passages 72 which communicate with an annular space 74 formed between the column 32 and the support 34.

Air entering the annular space 74 enters two branch passages 76 formed in the support 34, the passages 76 extending in opposite directions and one being associated with each of the mould portions 18 supported by the support 34. Each passage 76 has a throttle screw 78 extending thereinto so that the flow of air along the passage 76 can be controlled, the flow of air in each passage 76 being controllable independently. Each passage 76 enters a spring-loaded sealing member 80 which is mounted in a recess in the support 34 and is spring loaded towards one of the mould portions 18. Air entering the sealing member 80 passes out therethrough into a horizontal passage 82 formed in the mould portion with the sealing member making sealing contact with the wall of the mould portion 18 around the opening of the horizontal passage 82. This horizontal passage 82 has, as aforementioned, an opening through an outside wall of the mould portion 18 through which air can be received into the mould portion and is connected by further horizontal passages 84 and 86 to vertical passages 88 contained in the wall of the mould portion, each of the passages 88 having an opening through a bottom end of the mould portion 18 (not shown). The passages 88 are distributed around the mould portion so that the cooling effect achieved by the air is distributed around the mould portion 18.

The passage 48 in the column 12 is supplied with air from the chamber 42 through a passage 90 similar to the passage 50 and an annular space 92 similar to the space 52. The passage 48 communicates via, an annular space 94 similar to the space 54, with a passage 96 similar to the passage 56 but in the arm 28. Air entering the passage 96 is distributed to the mould portions 18 carried by the carrier 16 by similar means to the above-described parts of carrier 14, the parts of carrier 16 being mirror images of the parts of the carrier 14 and being given the same reference numerals in the drawings and are not further described hereinafter.

In the illustrative mould arrangement, the passages by which the air enters the mould portions 18 are not exposed to potential damage and are not flexible. Furthermore, the air supply to the mould portions on each carrier 14 and 16 can be independently controlled by varying the air supply to the chambers 40 and 42 and the air supplied to each mould portion 18 on a carrier 14 or 16 can be independently controlled by varying the setting of the throttle screws 78.

We claim:

1. A mould arrangement for use in a glassware container manufacturing machine comprising two mould portion carriers arranged to carry opposed mould portions, a column on which the carriers are both supported for pivoting movement about the column either towards one another to bring opposed mould portions into engagement with one another or away from one another to move opposed mould portions into mould open positions thereof, and cooling means operative to cool mould portions supported by the carriers, characterised in that the cooling means comprises two passages passing longitudinally through the column, one of the passages being associated with each of the carriers, each passage being connected at one end portion thereof to a source of air under pressure and at an opposite end portion thereof to a passage in the carrier, the passage in the carrier being connected to passages in a mould portion supported by the carrier so that air entering the passage in the column passes into the passages in the mould portion, and the sources of air under pressure associated with each of the passages in the column being controllable independently of one another to vary the flow of air to the passages in the mould portion.

2. A mould arrangement according to claim 1 wherein a further column is mounted on each carrier and a support is supported on the carrier for pivoting movement about the further column, the support being arranged to support two mould portions of different moulds, the passage in the carrier being connected to a passage which passes longitudinally through the further column and being connected to two branch passages each of which is connected to the passages in one of the mould portions.

3. A mould arrangement according to claim 2, wherein each branch passage contains a throttle by which the flow of air to the passages in the mould portion can be varied.

4. A mould arrangement according to any one of claims 1 to 3, wherein the passages in each mould portion comprise a horizontal passage having an opening through an outside wall of the mould portion and connected to the passage in the carrier through a spring-loaded sealing member which is mounted on the carrier and makes sealing contact with the wall of the mould portion around the opening of the horizontal passage.

5. A mould arrangement according to any one of claims 1 to 3, wherein the passages in each mould portion comprise a horizontal passage having an opening through an outside wall of the mould portion and connected to the passage in the carrier through a spring-loaded sealing member which is mounted on the carrier and makes sealing contact with the wall of the mould portion around the opening of the horizontal passage and wherein the horizontal passage in the mould portion is connected by further horizontal passages in the mould portion to vertical passages therein which have an opening through an end of the mould portion.

* * * * *